United States Patent
Sanjeeva et al.

(10) Patent No.: US 7,506,029 B2
(45) Date of Patent: Mar. 17, 2009

(54) ESTABLISHING COMMUNICATION BETWEEN A MESSAGING CLIENT AND A REMOTE DEVICE RUNNING A BROWSING APPLICATION

(75) Inventors: Naveen Dasa Sanjeeva, Milpitas, CA (US); Irvin Henderson, Palo Alto, CA (US); Thyagarajapuram S. Ramakrishnan, Saratoga, CA (US)

(73) Assignee: Yahoo! Inc., Sunnyvale, CA (US)

( * ) Notice: Subject to any disclaimer, the term of this patent is extended or adjusted under 35 U.S.C. 154(b) by 728 days.

(21) Appl. No.: 11/197,056

(22) Filed: Aug. 3, 2005

(65) Prior Publication Data

US 2007/0033255 A1 Feb. 8, 2007

(51) Int. Cl.
  *G06F 15/16* (2006.01)
  *H04L 12/66* (2006.01)
  *H04M 1/64* (2006.01)
  *H04Q 7/20* (2006.01)

(52) U.S. Cl. .................. 709/206; 709/203; 370/352; 455/466; 379/88.22

(58) Field of Classification Search .............. None
  See application file for complete search history.

(56) References Cited

U.S. PATENT DOCUMENTS

| 5,758,088 | A | 5/1998 | Bezaire et al. |
| 6,021,433 | A | 2/2000 | Payne et al. |
| 6,167,426 | A | 12/2000 | Payne et al. |
| 6,735,614 | B1 | 5/2004 | Payne et al. |
| 7,317,929 | B1 * | 1/2008 | El-Fishawy et al. ......... 455/466 |
| 2004/0078424 | A1 * | 4/2004 | Yairi et al. ................. 709/203 |
| 2006/0009243 | A1 * | 1/2006 | Dahan et al. ................ 455/466 |
| 2006/0072721 | A1 * | 4/2006 | Wisniewski .............. 379/88.22 |
| 2006/0171380 | A1 * | 8/2006 | Chia .......................... 370/352 |

* cited by examiner

*Primary Examiner*—Wen-Tai Lin
(74) *Attorney, Agent, or Firm*—Darby & Darby P.C.; John Tolomei (57) ABSTRACT

A first device running a messaging application, such as an instant messaging (IM) application, engages in messaging communication with a remote device running a browsing application. The remote device user is not associated with the messaging network of the first device. The first device sends an instant message directed to the remote device. The remote device is addressed using a means other than the addressing means used in the IM community associated with the first device, such as the MSISDN number of the remote device. The message is processed so that it may be displayed on the remote device by way of the browsing application. The user of the remote device may reply to the message using the browsing application, in which case the reply message is processed and forwarded to the first device, where it is converted into the IM format for display within the IM application.

20 Claims, 6 Drawing Sheets

ESTABLISHING COMMUNICATION BETWEEN A MESSAGING CLIENT AND A REMOTE DEVICE RUNNING A BROWSING APPLICATION

FIELD OF THE INVENTION

The present invention relates generally to communication between networked computing devices, and more particularly, but not exclusively, to establishing communication between a first device running an instant messaging client and a remote device running a browsing application.

BACKGROUND OF THE INVENTION

Instant messaging (IM) provides near-synchronous, typically one-on-one communication between users of computers linked over a network. IM systems typically conform to a client-server model in which a server (or cluster of servers) is maintained by an IM service provider controlling traffic coming to and from the server. A user who wishes to use the IM service generally registers with the service provider and downloads and runs an appropriate IM client application. Using the IM client, the user can connect to the IM server in order to send messages to and receive messages from another user running a compatible IM client application. IM systems typically provide information regarding the online presence of other, remotely-connected users with whom messaging is possible. If the second user is not running a compatible IM application and signed in to the same IM service, the two users cannot communicate by IM.

Most IM users are users of conventional general-purpose computing devices, such as personal computers (PCs). Other techniques for messaging have also become available for users of wireless mobile devices, such as mobile phones and PDAs. For example, Short Message Service (SMS) is a text message service for wireless telephony networks that can be used to send short messages between users. Richer IM-like services have been slower to develop for mobile devices, and there has generally been a lack of unity and seamless integration between messaging systems for mobile devices and standard IM systems associated mainly with PCs and the like. This has limited the degree and quality of communication between PC users and mobile device users.

Some mobile devices are configured to operate in accordance with Wireless Application Protocol (WAP) or similar technologies. WAP is an open protocol designed generally to enable access to information and services on the Internet for narrowband devices. A WAP gateway converts WAP requests from a WAP-capable device into HTTP requests and converts the information returned by a web server. A mobile device with a limited display may thus browse web pages written in Wireless Markup Language (WML). Other mobile devices may provide access to web-based or other Internet or Internet-like services by way of other protocols and technologies, such as iMode, or through HTML browsers running on the mobile device.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following detailed description, which is to be read in association with the accompanying drawings, wherein.

DETAILED DESCRIPTION OF THE INVENTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein. Rather, these embodiments are provided so that this disclosure will be thorough and complete and will convey fully the scope of the invention to those having skill in the art. Among other embodiments, the present invention may be embodied as methods or devices. Accordingly, the present invention may take the form of a software embodiment, a hardware embodiment, or an embodiment combining software and hardware aspects. The following detailed description is, therefore, not to be taken in a limiting sense.

Briefly stated, the present invention is directed towards enabling messaging communication between a first computing device, such as a personal computer (PC) or a mobile device, that runs a messaging application, and a remote computing device that runs a browsing application but generally does not run a messaging application. The remote computing device can be, for example, another mobile device or another PC. The first computing device runs the messaging application, such as an instant messaging (IM) client, to send a message and receive a reply from the remote computing device, which employs the browsing application to view and reply to the message. Communication is initiated by the first computing device, which sends a message directed to the remote computing device by way of the messaging application. The message is processed so that it may be accessed by and displayed on the remote computing device by way of the browser application. The remote computing device is normally addressed by a mobile identification number, such as the Mobile Subscriber Integrated Services Digital Network (MSISDN) number. The remote computing device may send a reply to the message to the computing device, at which the reply is processed and displayed for viewing as a message within the messaging client.

Illustrative Operating Environment

Figure 1:
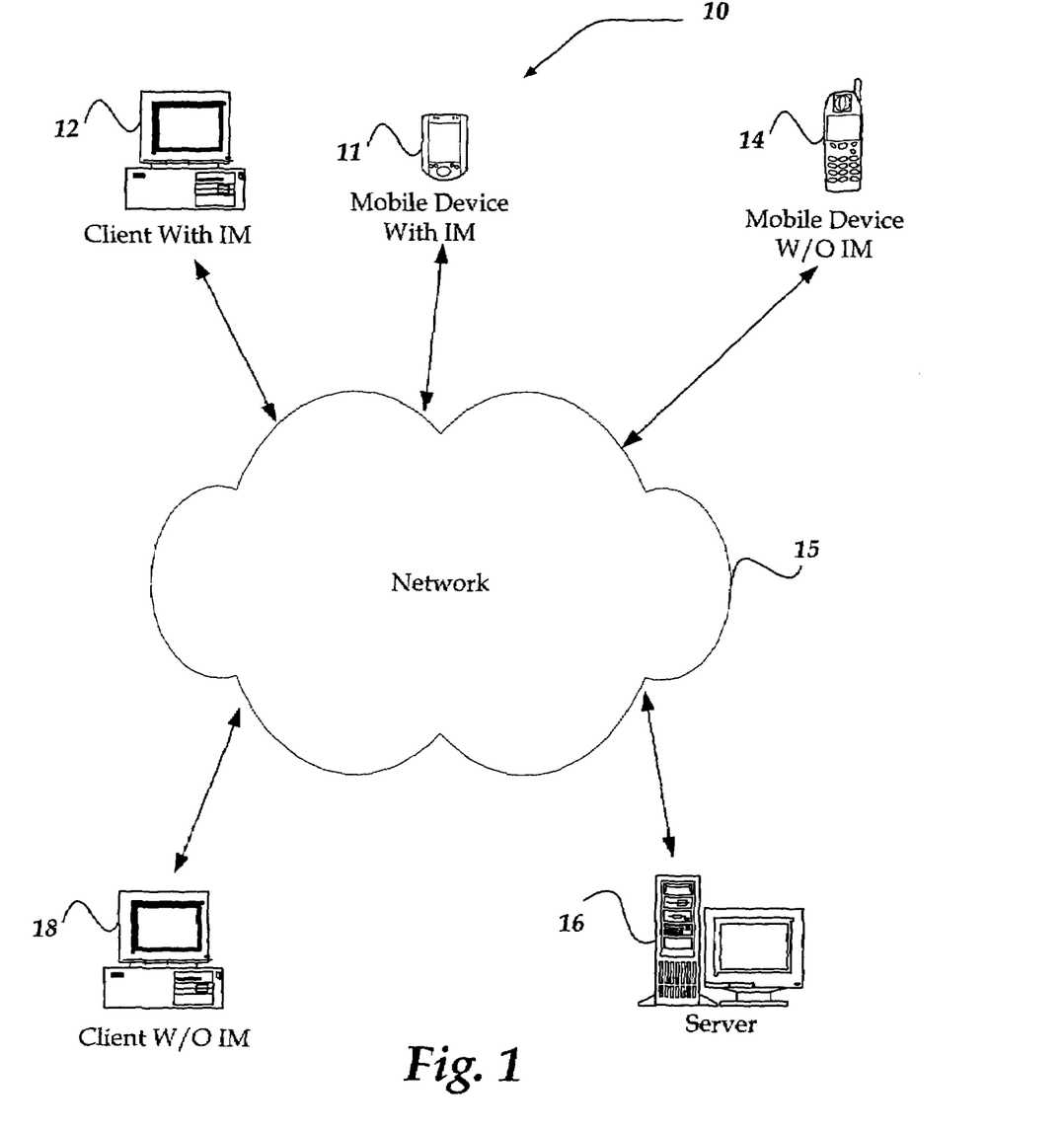
FIG. 1 shows a functional block diagram illustrating one embodiment of an environment for practicing the invention.

FIG. 1 illustrates one embodiment of an environment in which the invention may operate. However, not all of the components depicted may be required to practice the invention, and variations in the arrangement and type of the components may be made without departing from the spirit or scope of the invention.

As shown in the figure, system 10 may include network 15, at least one server 16, client 12 and mobile device 11, which both run an instant messaging (IM) application. The system also includes mobile device 14 and client 18; and although neither one runs IM applications, they run browsing applications. Network 15 is in communication with and enables communication among mobile devices 11 and 14, clients 14 and 18, and server 16.

Client 12 may include virtually any computing device capable of running a messaging application such as IM and of transmitting and receiving messages over a network, such as network 15, to and from another computing device, such as server 16, by way of the IM application. Such messages may be directed to a user running an IM application at another client computing device or at a mobile device. Client 12 may be a device generally considered a conventional, general-purpose computing device that typically connects to a network using a wired communications medium, such as a PC, a notebook computer, network appliance, and the like. Client 12 may also or alternatively be a mobile terminal device, a device usually considered a special-purpose computing device, or a device that is equipped to communicate over a wired and/or wireless communications medium. Client 12, which features a user interface and a communications interface, is capable of running a messaging application such as IM, and the like, which may be based on an open standard or a proprietary protocol. Client 12 may be further configured with a browser application that is configured to retrieve and display web pages, web-based messages, and the like. Client 18 may be substantially similar to client 12 such as being capable of running a browser application. However, client 18 does not run a messaging application such as IM, and the like.

Mobile devices 11 and 14 may also include virtually any computing device capable of receiving and sending data wirelessly over a network, such as network 15, to and from another computing device, such as server 16, each other, clients 12 and 18, and the like. In some embodiments of the invention, mobile devices 11 and 14 are capable of communicating in accordance with the Wireless Application Protocol (WAP), and the like. However, embodiments of the invention comprising mobile devices implementing other protocols and technologies providing mobile Internet or Internet-like services, such as iMode and HTTP, are also contemplated.

Mobile devices 11 and 14 provide a user interface that enables the user to control settings and to instruct the device to perform operations. Mobile devices 11 and 14 are configured with or capable of running a browser application. For example, a WAP-capable mobile device may have a browser that can retrieve and display a page written in WML or WML-Script and the like. The user may select a hyperlink within a displayed WML page to display a new page associated with that link. In other embodiments, non-WAP-enabled mobile devices may provide similar functionality.

Network 15 is configured to couple one computing device to another computing device, enabling them to engage in data communication. Network 15 is enabled to employ any form of medium for communicating information from one electronic device to another. Also, network 15 may include wireless access networks, such as a cellular network, and/or wired networks, and may include local area networks (LANs), wide area networks (WANs), and the like. On an interconnected set of LANs, including those based on differing architectures and protocols, a router acts as a link between LANs, enabling messages to be sent from one to another. Communication links within LANs typically include twisted wire pair or coaxial cable, while communication links between networks may use cellular telephone signals over air, analog telephone lines, full or fractional dedicated digital lines including T1, T2, T3, and T4, Integrated Services Digital Networks (ISDNs), Digital Subscriber Lines (DSLs), wireless links including satellite links, or other communication links known to those skilled in the art. Furthermore, remote computers and other related electronic devices could be remotely connected to either LANs or WANs by way of a modem and temporary telephone link. In essence, network 15 includes any communication method by which information may travel between devices 12-14 and server 16. Network 15 is constructed for use with various wired and wireless communication protocols including TCP/IP, UDP, SIP, SMS, RTP, WAP, CDMA, TDMA, WCDMA. CDMA 2000, EDGE, UMTS, GSM, GPRS, UWB, WiMax, IEEE 802.11X, and the like.

The media used to transmit information in communication links as described above generally include any media that can be accessed by a computing device. Computer-readable media may include computer storage media, wireless and wired communication media, or any combination thereof. Additionally, computer-readable media typically embody executable instructions, data structures, program modules, or other data in a modulated data signal such as a carrier wave, data signal, or other transport mechanism, and include any information delivery media. The terms "modulated data signal" and "carrier wave signal" include a signal that has one or more of its characteristics set or changed in such a manner as to encode information, instructions, data, and the like in the signal. By way of example, communication media include wireless media such as acoustic, RF, infrared, and other wireless media, and wired media such as twisted pair, coaxial cable, fiber optics, wave guides, and other wired media.

One embodiment of a wired computing device suitable for use as a client or a server is described in further detail below in conjunction with FIG. 2. Briefly, computing device 20 may include any computational device capable of connecting to network 15 to enable a user to communicate with other clients, mobile devices, and/or servers, including by way of an IM application and/or by way of a browser application running on device 20, as well as by other means. Device 20 may include many more components than those shown. The components shown, however, are sufficient to disclose an illustrative embodiment for practicing the invention. Many of the components of device 20 may also be present in mobile devices 11 and 14, in addition to clients 12 and 18 and server 16 as illustrated in FIG. 1.

Figure 2:
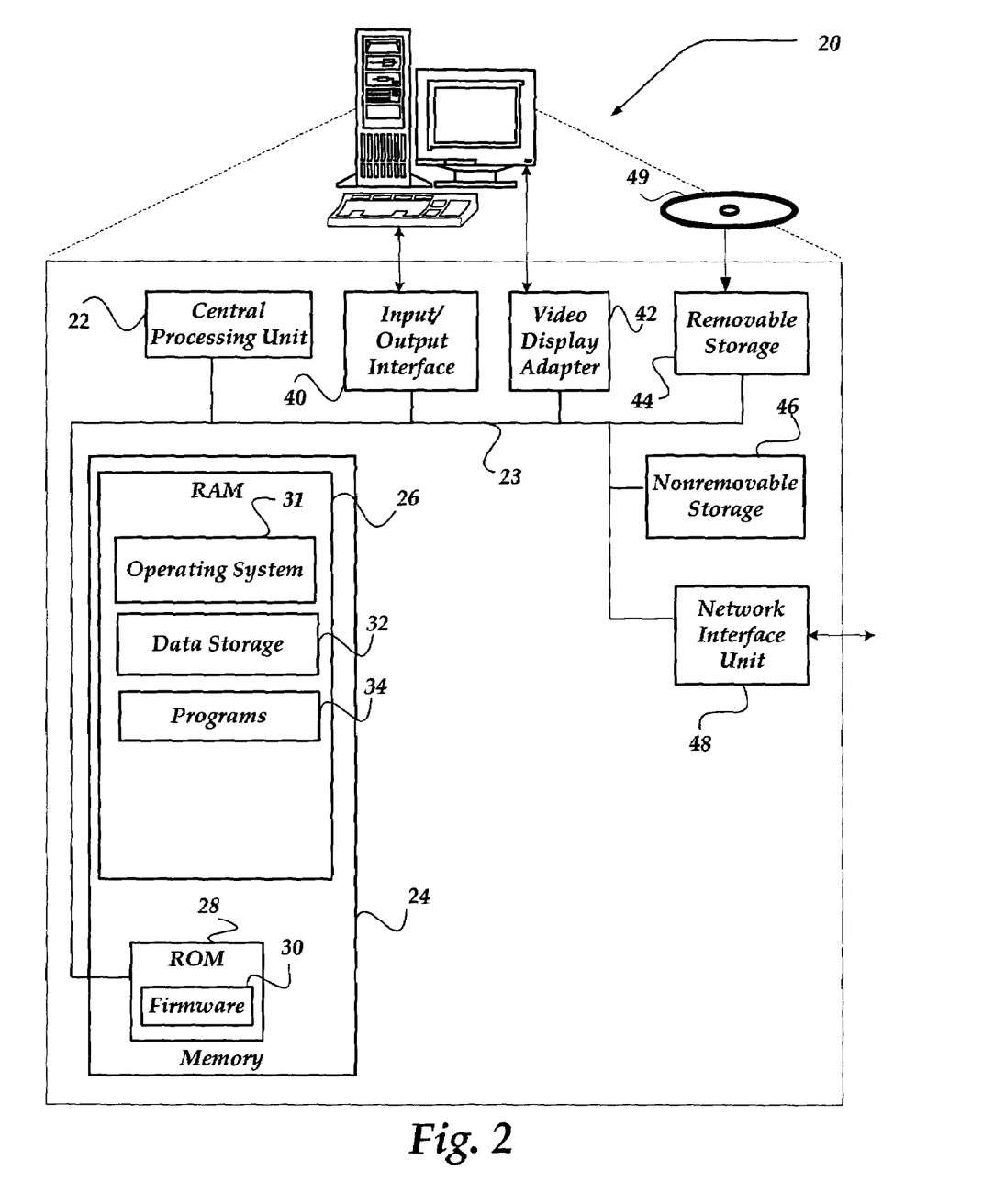
FIG. 2 shows one embodiment of a client and/or server device that may be included in a system implementing the invention.

As shown in FIG. 2, device 20 includes at least one processing unit 22 in communication with a main memory 24 by way of a bus 23 or the like. Main memory 24 generally includes RAM 26, ROM 28, and may include other storage means, such as one or more levels of cache. Main memory 24 illustrates a type of computer-readable media, namely computer storage media. Computer storage media may include volatile and nonvolatile, removable and non-removable media implemented in any method or technology for storage of information such as computer-executable instructions, data structures, program modules, and the like. Other examples of computer storage media include EEPROM, flash memory or other semiconductor memory technology, CD-ROM, DVD or other optical storage media, magnetic tape, magnetic disk storage or other magnetic storage devices, or any other medium that can be used to store the desired information and that can be accessed by a computing device.

Main memory 24 typically stores firmware 30 for bootloading and controlling low-level operation of device 20.

Main memory 24 also stores an operating system 31 as well as application programs 34 and data. Application programs 34 may include, for example, a messaging application such as an IM client, a browser application for displaying web pages and the like, and programs for enabling data communication with another electronic device linked to device 20 by way of a network.

Device 20 includes an input/output interface 40 for communicating with input/output devices, such as a keyboard, mouse, printer, and the like. A user of device 20 may use input/output devices to interact by way of a user interface that may be separate from or integrated with operating system 31 and/or programs 34. Interaction with the user interface may include interaction by way of a visual display, using a video display adapter 42.

Device 20 may include secondary storage for storage of program modules, data and the like not in main memory 24, including removable computer-readable storage 44 and/or non-removable computer-readable storage 46. Removable storage 44 may comprise one or more of optical disc media, floppy disks, and magnetic tape readable by way of an optical disc drive, floppy disk drive, and tape drive, respectively. Secondary storage may also include flash memory or other memory technology and generally includes any medium usable for storage of information and accessible by a computing device.

By way of network interface unit 44, device 20 may communicate with a WAN such as the Internet, a LAN, a wired telephone network, a wireless communications network, or some other communications network, such as network 15 in FIG. 1. Network interface unit 44 may comprise a transceiver, a network interface card, and the like.

Figure 3:
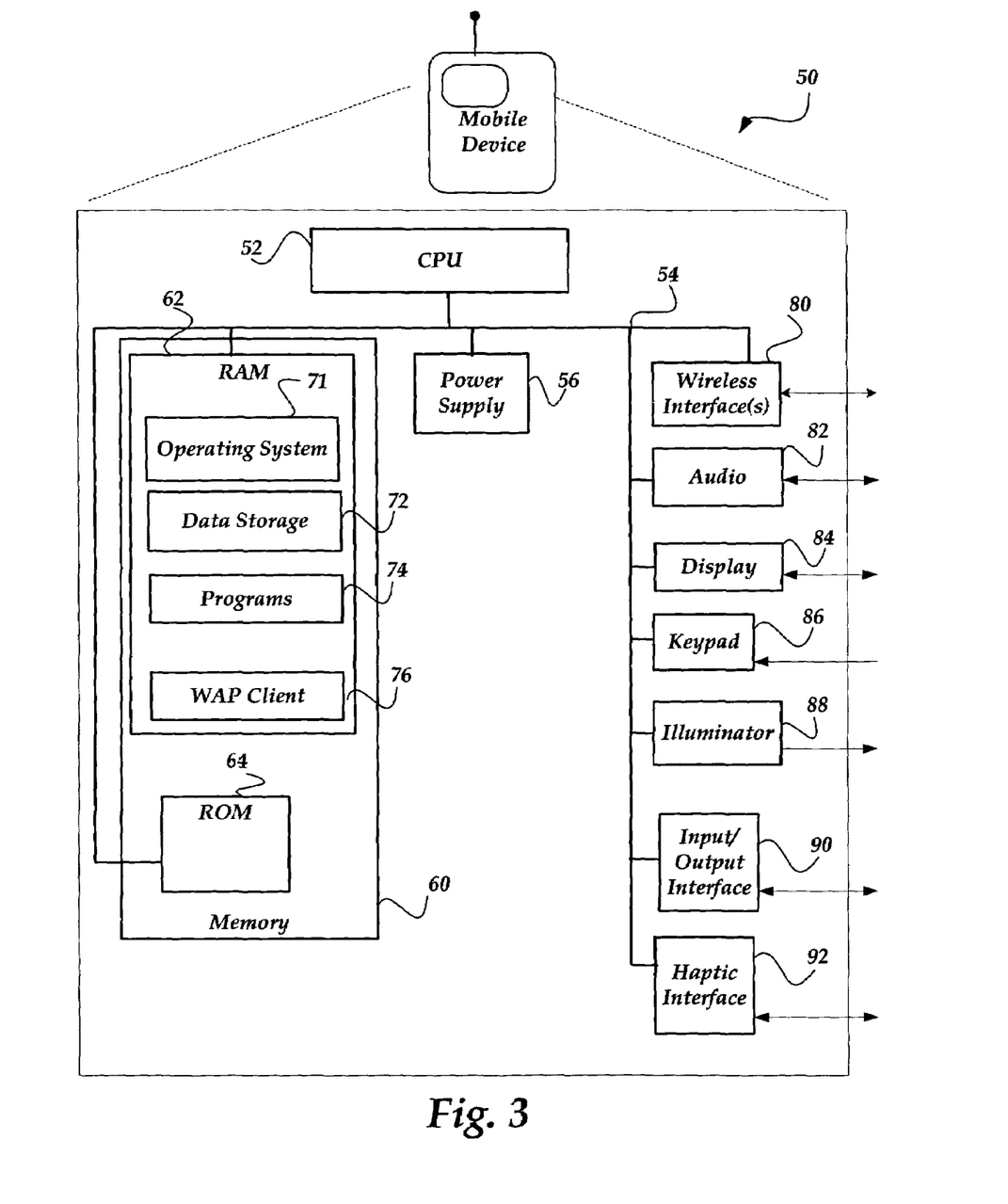
FIG. 3 shows one embodiment of a mobile device that may be included in a system implementing the invention.

FIG. 3 shows an exemplary mobile device 50, according to one embodiment of the invention. In one embodiment, mobile device 50 is a mobile telephone that is arranged to send and receive voice communications, text-based messages, and other data by way of one or more wireless communications interfaces. Generally, mobile device 50 may comprise any electronic device capable of such wireless communication, including any personally mobile electronic device. Mobile devices are typically capable of communication by connecting to one or more wireless networks, connecting to multiple nodes of a single wireless network, communicating over one or more channels to one or more networks, or otherwise engaging in one or more communication sessions. Such devices include mobile telephones, cellular telephones, smart phones, pagers, RF devices, IR devices, integrated devices combining one or more of the preceding devices, and the like. Mobile device 50 may also comprise other electronic devices such as PDAs, handheld computers, PCs, microprocessor-based or programmable consumer electronics, wearable computers, and the like.

Mobile device 50 may include many more components than those shown in FIG. 3, and need not contain all the components shown therein. However, the components shown are sufficient to disclose an illustrative embodiment for practicing the present invention. As shown in the figure, mobile device 50 includes a processing unit 52 in communication with a memory 60 by way of a bus 54. Memory 60 may include RAM 62, ROM 64, and other storage means. Memory 60 also stores an operating system 71. Memory 60 also provides data storage 72 and storage of programs 74. Programs 74 may include for example, a messaging application such as an IM client, a browser application for displaying web pages and the like, and programs for enabling wireless data communication with another electronic device linked to device 50 by way of a wireless network.

Also, programs 74 may include computer-executable instructions which, when executed on mobile device 50, cause transmission, reception, and other processing of audio data, video data, text message data, web pages, WML pages, and the like, and enable wireless communication with another device. In addition, in one embodiment of the invention, memory 60 stores WAP client applications 76 enabling device 60 to communicate in accordance with the WAP protocol. Alternatively, in other embodiments, technologies other than WAP may be implemented to enable access by the wireless device to Internet-based and/or Internet-like services.

Mobile device 50 also includes a power supply 56, one or more wireless interfaces 80, an audio interface 82, a display 84, a keypad 86, an illuminator 88, an input/output interface 90, and a haptic interface 92. Power supply 56 provides power to wireless device 50. A rechargeable or non-rechargeable battery may be used to provide power. The power may also be provided by an external power source, such as an AC adapter or a powered docking cradle that supplements and/or recharges a battery.

Mobile device 50 may optionally communicate with a base station (not shown), or directly with another wireless mobile or non-mobile device. Wireless interface 90 includes circuitry for coupling wireless device 50 to one or more wireless networks, and is constructed for use with one or more communication protocols and technologies including, but not limited to, GSM, CDMA, TDMA, EDGE, UMTS, WCDMA, CDMA 2000, UDP, TCP/IP, SMS, GPRS, WAP, UWB, WiMax, IEEE 802.11X, and the like.

Audio interface 82 is arranged to produce and receive audio signals such as the sound of a human voice. For example, audio interface 82 may be coupled to a speaker and microphone (not shown) to enable telecommunication with others and/or to generate an audio acknowledgment for some action. Display 84 may be a liquid crystal display, gas plasma, light emitting diode, or any other type of display used with a mobile device or other wireless device. Display 84 may also include a touch sensitive screen arranged to receive input from an object such as a stylus or a human digit.

Keypad 86 may comprise any input device arranged to receive input from a user. For example, keypad 86 may include a push button numeric dial, or an alphanumeric keyboard. Keypad 86 may also include command buttons that are associated with selecting and sending images. Illuminator 88 may provide a status indication and/or provide light. Illuminator 88 may remain active for specific periods of time or in response to events. For example, when illuminator 88 is active, it may backlight the buttons on keypad 86 and stay on while mobile device 50 is powered. Also, illuminator 88 may backlight these buttons in various patterns when particular actions are performed, such as dialing another wireless device. Illuminator 88 may also cause light sources positioned within a transparent or translucent case of mobile device 50 to illuminate in response to actions.

Mobile device 50 also comprises input/output interface 90 for communicating with external devices. Input/output interface 90 may utilize one or more appropriate communication technologies, such as USB, IR, Bluetooth, and the like. Haptic interface 92 is arranged to provide tactile feedback to a user of the mobile device. For example, haptic interface 92 may be employed to vibrate mobile device 50 in a particular way when a user of a wireless or wired telephone device is calling mobile device 50.

Exemplary Operations

Figure 4:
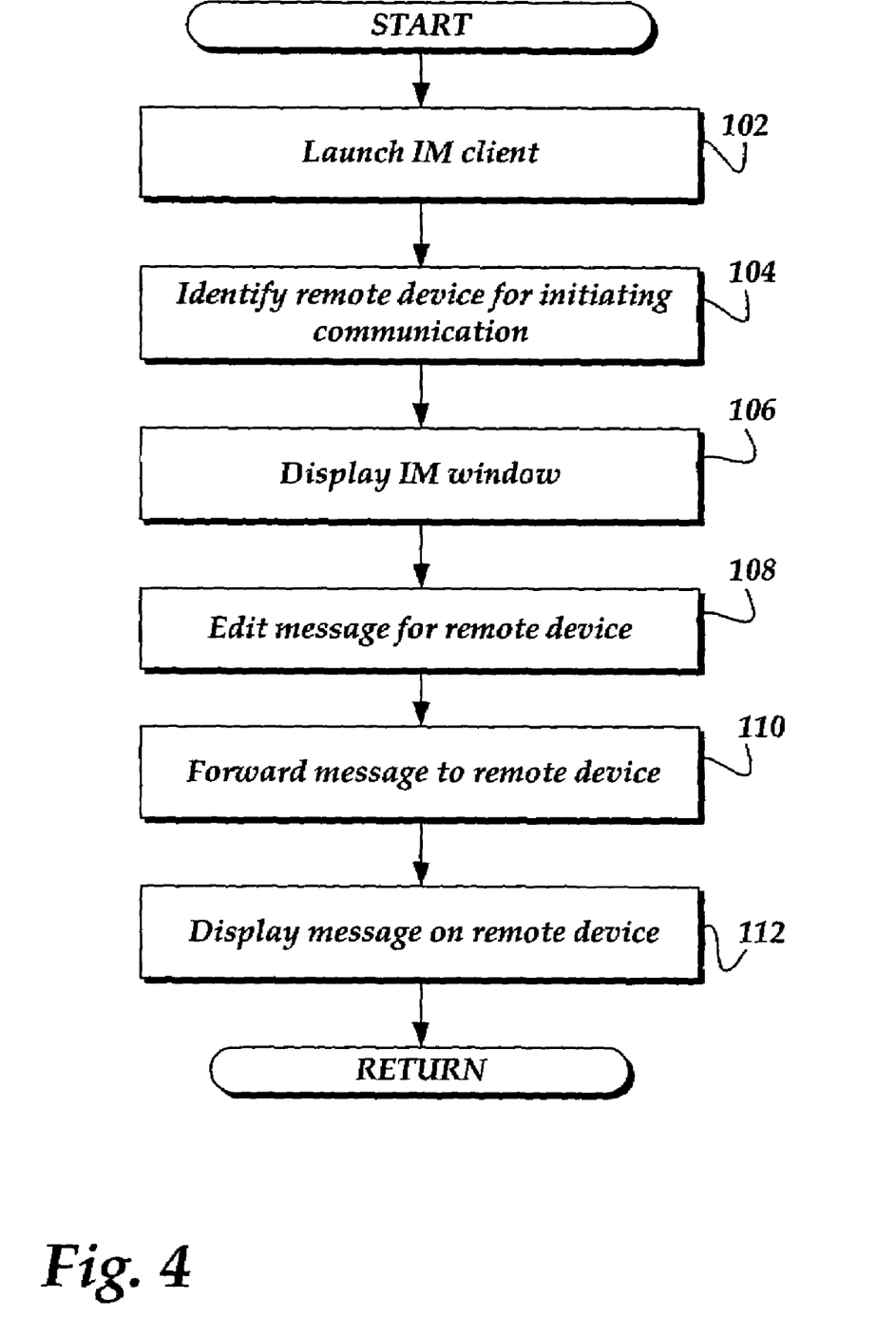
FIG. 4 is a flow diagram illustrating exemplary operations of a process for sending a message from a client to a remote device.

FIG. 4 is a flow diagram illustrating a process by which a first computing device running an instant messaging client application establishes messaging communication with a remote computing device, such as a WAP-enabled mobile wireless device, PC, and the like. The remote device runs a browser application and in general is not associated with the IM network or community of the first device. After a start block, the process flows to block 102, at which the IM client on the first device is launched and the user of the IM client signs into a networked IM service, using an appropriate user ID. The process next flows to block 104, where the user, by way of the IM client, identifies a particular remote contact with which communication is to be initiated. For example, the user may select an available option in a user interface menu, such as an address book tab, to select a particular listed contact. The remote device is addressed using a means other than the means used in the IM network or community associated with the first device. For example, the MSISDN of the remote device may be used to address the remote device.

Next, at block 106, an IM window is displayed. The IM window includes a displayed space for entry of a message, such as a text message. The IM window is associated with a reply identifier, allowing any response to be forwarded to the first device and displayed in the same window. In one embodiment, the messaging transport to the remote device is by way of a Short Message Service (SMS) message or another messaging transport imposing a size limit on text messages. The IM window may accordingly display a dynamic character counter. The IM window typically includes a send button or the like.

The process next flows to block 108, at which the user, interacting with the IM client, edits and sends the message intended for the remote device. Next, at block 110, the message, marked with the reply identifier, is forwarded to the remote device. The process then returns to performing other actions.

In one embodiment, the message is forwarded to the remote device by way of an SMS transport server, such as an SMSC. Such a server, or another intermediate server, processes the message before forwarding it to the remote device. For example, validation of the mobile address of a message intended for a mobile device may be performed. Furthermore, validation of the message with respect to any rules imposed by the carrier or provider of the messaging service may be performed. The message may also be logged according to sender and/or recipient.

Moving from block 110, the process steps to block 112 where the forwarded message is received by the remote device and subsequently displayed in a browser application running on the remote device. In one embodiment, a notification of the availability of the message is displayed on the mobile device. Next, the process returns to performing other actions.

Figure 5:
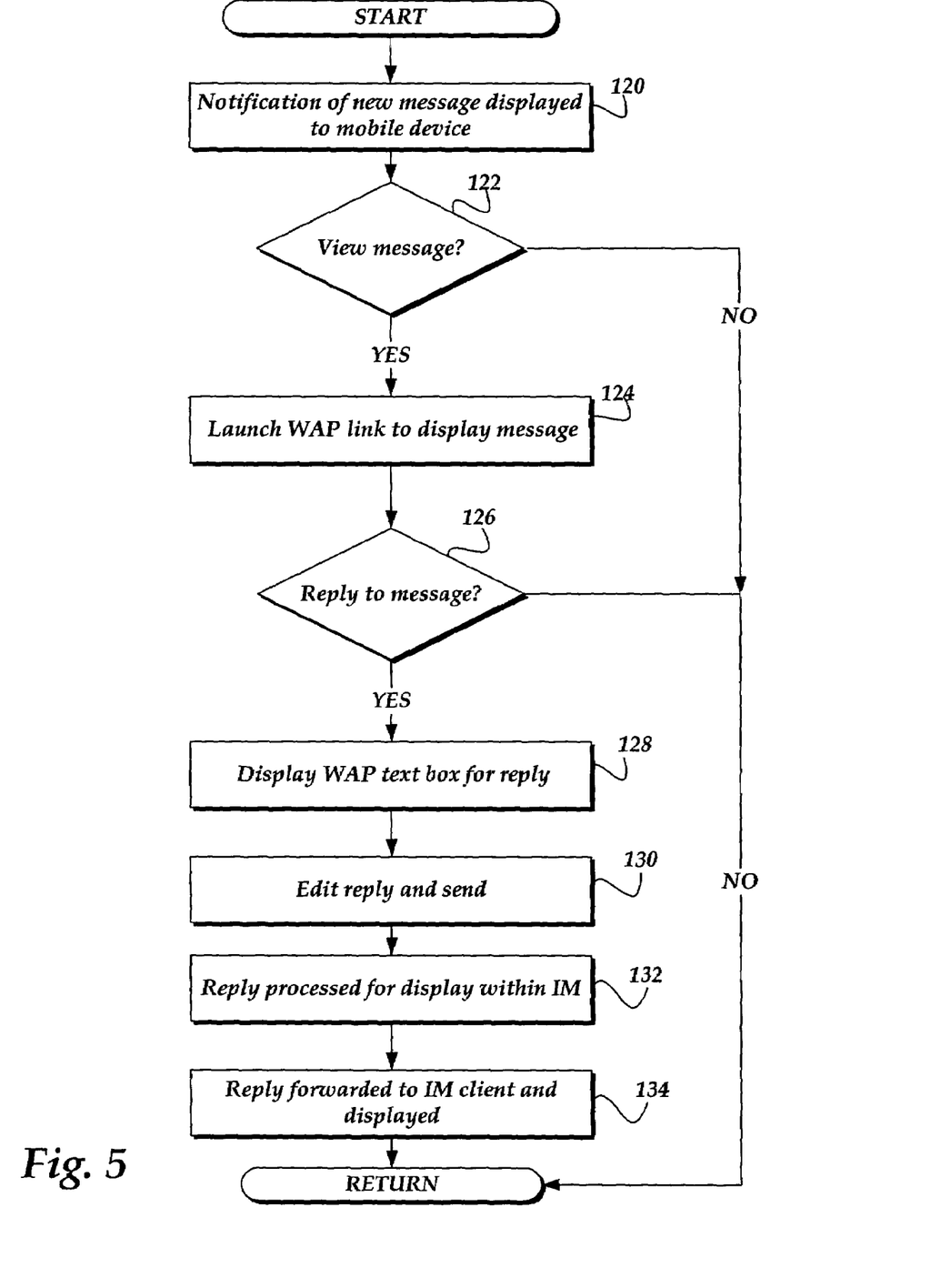
FIG. 5 is a flow diagram illustrating exemplary operations of a process for replying to a message from a client to a mobile device.

FIG. 5 is a flow diagram illustrating a process by which an instant message sent by a device running an IM client application is received and acted upon by a mobile device by way of a browser application. After a start block, the process flows to block 120, where a notification of the availability of a new message is displayed to the mobile device. In one embodiment, the notification is received in the form of a WAP alert or WAP push and contains an embedded WAP link to that message, associated with a URL.

At decision block 122 the user of the mobile device decides whether to view the message.

If not, the process returns to perform other actions. Otherwise, the process flows to block 124, at which the user of the mobile device manipulates the user interface of the mobile device to launch the WAP link embedded in the notification (for example, by selecting a displayed 'GO' associated with the link), whereupon the page containing the message is displayed on the mobile device. The process next flows to decision block 126, where the user of the mobile device decides whether to reply to the message. If not, processing returns to perform other actions. Otherwise, processing flows to block 128, at which a text box for the reply is presented to the mobile user. At block 130 the user of the mobile device edits and sends the reply message from the browser. In one embodiment, the mobile user is presented with an option to block messages from the user from whom the message was received, and/or to block all messages from all users.

The process next flows to block 132, where the reply message is processed so that it may be displayed as an instant message within the IM client being run at the first device. The processing of the reply may occur at one or more intermediate servers. At block 134, the reply is forwarded to the IM client at the first device. The message may be displayed as a reply within the original IM window used at the first device for sending the initial message. This is possible because of the presence of the reply identifier. Next, the process returns to performing other actions.

Figure 6:
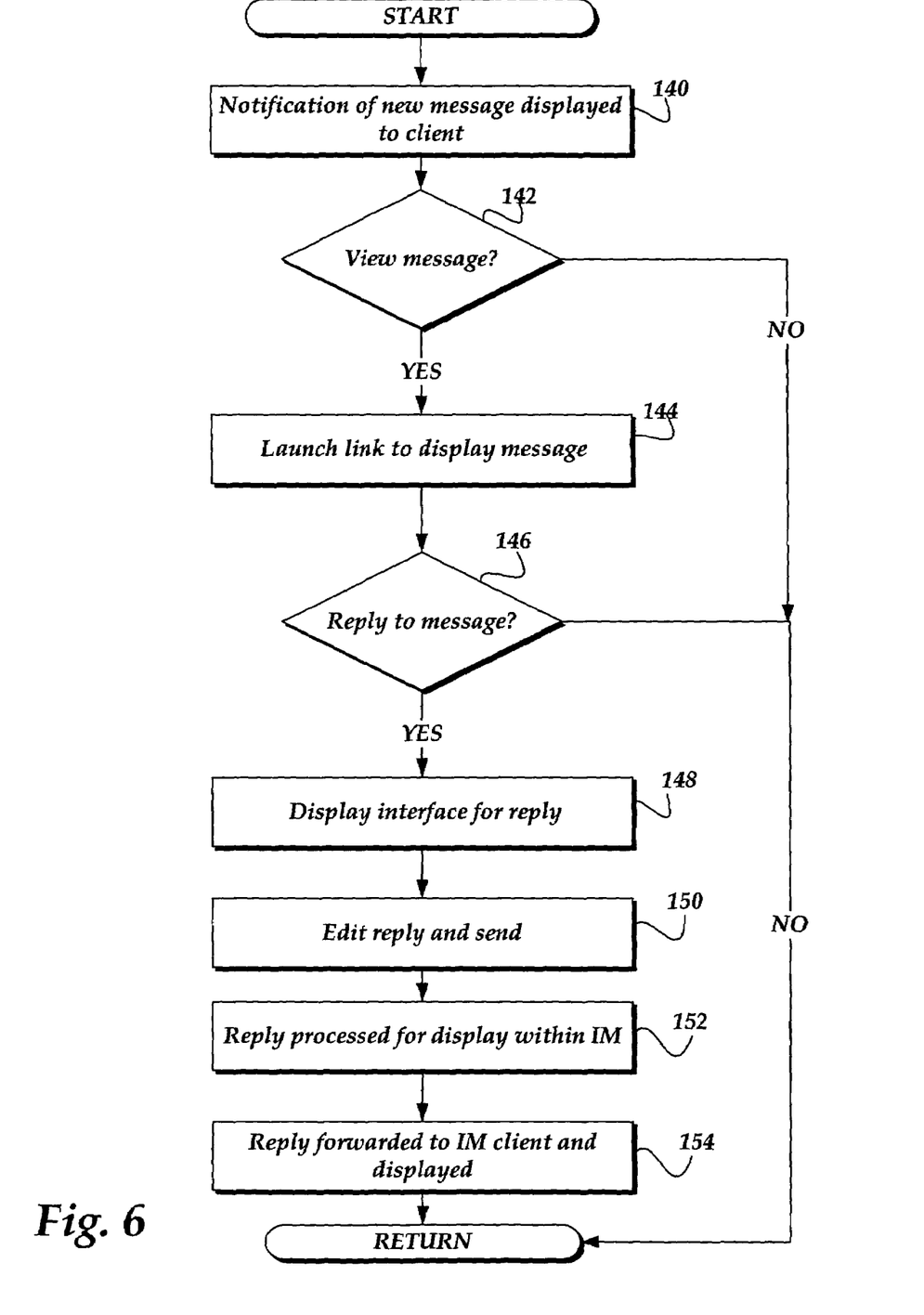
FIG. 6 is a flow diagram illustrating exemplary operations of a process for replying to a message from a client to a remote device not running an IM application.

FIG. 6 is a flow diagram illustrating a process by which an instant message sent by a first device running an IM client application is received and acted upon by a client device by way of a browser application rather than by way of an IM application. After a start block, the process flows to block 140, where a notification of the availability of a new message is displayed to the client. The notification contains a link to that message, associated with a URL.

At decision block 142 the user operating the client decides whether to view the message. If not, the process returns to perform other actions. Otherwise, the process flows to block 144, at which the user selects the link contained in the notification, whereupon the page containing the message is displayed on the client device. For example, a web browser may be used to retrieve and display a web page that contains the message. The process next flows to decision block 146, where the user of the client device decides whether to reply to the message. If not, processing returns to perform other actions. Otherwise, processing flows to block 148, at which the browser application displays a space for entry of a reply. At block 150 the user of the client device edits and sends the reply message.

The process next flows to block 152, where the reply message is processed so that it may be displayed as an instant message within the IM client being run at the first device that sent the message to the client device. The processing of the reply may occur at one or more intermediate servers. At block 154, the reply is forwarded to the IM client at the first device. The message may be displayed within the original IM window used at the first device for sending the initial message. Next, the process returns to performing other actions.

The above specification and examples provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method for messaging between a first computing device and a second computing device over a network, comprising:

sending a message addressed to the second device by way of an instant messaging application executing on the first device;

processing the message into a selectable link so that the message is accessible by the second device by way of a browsing application executing on the second device;

transmitting a notification to the second device, the notification including the selectable link to a page containing the message;

receiving a reply to the message from the second device, wherein the reply is generated with the second device's browsing application and based on access of the message via the selectable link; and transmitting the reply to the message from the second device to the first device, wherein the reply is generated with the second device's browsing application and translated into a format that enables the first device's instant messaging application to access the reply.

2. The method of claim 1, wherein the messaging application is an instant messaging client.

3. The method of claim 1, wherein sending the message addressed to the second device further comprises employing an MSISDN number associated with the second device.

4. The method of claim 1, wherein processing the message is performed at a server linked to the first device and the second device.

5. The method of claim 1, wherein the second device is a WAP-capable device.

6. The method of claim 5, wherein transmitting the notification to the second device further comprises sending one of a WAP push and a WAP alert.

7. The method of claim 5, further comprising associating the message with a reply identifier.

8. The method of claim 4, wherein the server is an SMS transport server.

9. The method of claim 1, further comprising validating an address associated with the message.

10. The method of claim 1, further comprising selecting the link to view the message.

11. The method of claim 1, further comprising:
entering a reply to the message within the browsing application executing on the second device;
processing the reply so that it can be displayed by the messaging application on the first device; and
forwarding the reply to the first device for display by the messaging application.

12. The method of claim 1, further comprising presenting to the second device an option to block at least one sender of a message.

13. A server for messaging between a first device and a second device, comprising:
a network interface;
a processor in communication with the network interface; and
memory in communication with the processor and storing machine instructions for performing actions, including:
receiving, from the first device, a message addressed to the second device by way of an instant messaging application executing on the first device;
processing the message into a selectable link so that the message is accessible by the second device by way of a browsing application executing on the second device;
transmitting a notification to the second device, the notification including the selectable link to a page containing the message;
receiving a reply to the message from the second device, wherein the reply is generated with the second device's browsing application and based on access of the message via the selectable link; and
transmitting the reply to the message from the second device to the first device, wherein the reply is generated with the second device's browsing application and translated into a format that enables the first device's instant messaging application to access the reply.

14. The server of claim 13, wherein the message is addressed to the second device by way of an MSISDN number associated with the second device.

15. The server of claim 13, wherein the second device is a WAP-capable device.

16. The server of claim 13, further comprising:
receiving a reply to the message from the second device;
processing the reply so that it can be displayed by the messaging application on the first device; and
forwarding the reply to the first device for display by the messaging application.

17. A client for messaging between a first device and a second device, comprising:
a network interface;
a processor in communication with the network interface; and
a memory in communication with the processor and storing machine instructions for performing actions, including:
sending a message addressed to the second device by way of an instant messaging application executing on the first device;
enabling the processing of the message into a selectable link so that the message is accessible by the second device by way of a browsing application executing on the second device; and
transmitting a notification to the second device, the notification including the selectable link to a page containing the message;
receiving a reply to the message from the second device, wherein the reply is generated with the second device's browsing application and based on access of the message via the selectable link; and
transmitting the reply to the message from the second device to the first device, wherein the reply is generated with the second device's browsing application and translated into a format that enables the first device's instant messaging application to access the reply.

18. The client of claim 17, wherein the message is addressed to the second device by way of an MSISDN number associated with the second device.

19. The client of claim 17, wherein the second device is a WAP-capable device.

20. The client of claim 17, further comprising:
receiving a reply to the message from the second device, wherein the reply is created within the browsing application executing on the second device; and
processing the reply so that it can be displayed by the messaging application on the first device.

* * * * *

UNITED STATES PATENT AND TRADEMARK OFFICE
CERTIFICATE OF CORRECTION

PATENT NO. : 7,506,029 B2
APPLICATION NO. : 11/197056
DATED : March 17, 2009
INVENTOR(S) : Naveen Dasa Sanjeeva et al.

It is certified that error appears in the above-identified patent and that said Letters Patent is hereby corrected as shown below:

In column 9, claim 13, line 56, before "memory" insert -- a --.

Signed and Sealed this

Fifth Day of January, 2010

David J. Kappos
*Director of the United States Patent and Trademark Office*